United States Patent
Mitchell et al.

(10) Patent No.: US 7,259,767 B2
(45) Date of Patent: Aug. 21, 2007

(54) IMAGE TEXTURE SEGMENTATION USING POLAR S-TRANSFORM AND PRINCIPAL COMPONENT ANALYSIS

(75) Inventors: Ross Mitchell, Calgary (CA); Hongmei Zhu, Richmond Hill (CA); Yunyan Zhang, Calgary (CA); Alan Law, Kelowna (CA)

(73) Assignee: Calgary Scientific Inc., Calgary, Alberta (CA)

( * ) Notice: Subject to any disclaimer, the term of this patent is extended or adjusted under 35 U.S.C. 154(b) by 290 days.

(21) Appl. No.: 11/118,366

(22) Filed: May 2, 2005

(65) Prior Publication Data

US 2005/0253863 A1 Nov. 17, 2005

Related U.S. Application Data

(60) Provisional application No. 60/566,417, filed on Apr. 30, 2004.

(51) Int. Cl.
*G09G 5/00* (2006.01)
*G06T 15/10* (2006.01)
*G06K 9/34* (2006.01)
*G06K 9/40* (2006.01)
*G06K 9/36* (2006.01)
*G06T 15/50* (2006.01)
*G06K 9/32* (2006.01)
*G06K 9/62* (2006.01)

(52) U.S. Cl. .................. 345/582; 345/427; 382/173; 382/224; 382/260; 382/280

(58) Field of Classification Search ................ 345/418, 345/424–428, 581–582, 586, 589, 606, 615, 345/639–643; 382/173, 216, 224–225, 260, 382/276, 280–282, 295–300
See application file for complete search history.

(56) References Cited

U.S. PATENT DOCUMENTS 6,266,452 B1 * 7/2001 McGuire ..................... 382/294
6,282,300 B1 * 8/2001 Bloom et al. ............... 382/100

OTHER PUBLICATIONS

L. Mansinha et al., Local S-spectrum analysis of 1D and 2D data, Phys. Earth Plan Interiors, pp. 1-11, Feb. 27, 1997.*

* cited by examiner

*Primary Examiner*—Wesner Sajous
(74) *Attorney, Agent, or Firm*—Freedman & Associates

(57) ABSTRACT

The present invention relates to a method and system for segmenting texture of multi-dimensional data indicative of a characteristic of an object. Received multi-dimensional data are transformed into second multi-dimensional data within a Stockwell domain based upon a polar S-transform of the multi-dimensional data. Principal component analysis is then applied to the second multi-dimensional data for generating texture data characterizing texture around each data point of the multi-dimensional data. Using a classification process the data points of the multi-dimensional data are partitioned into clusters based on the texture data. Finally, a texture map is produced based on the partitioned data points. The present invention provides image texture segmentation based on the polar S-transform having substantially reduced redundancy while keeping maximal data variation.

24 Claims, 10 Drawing Sheets

IMAGE TEXTURE SEGMENTATION USING POLAR S-TRANSFORM AND PRINCIPAL COMPONENT ANALYSIS

This application claims the benefit of U.S. Provisional Patent Application No. 60/566,417 filed Apr. 30, 2004.

FIELD OF THE INVENTION

This invention relates to image texture segmentation and in particular to an image texture segmentation method using a polar S-transform and principal component analysis.

BACKGROUND OF THE INVENTION

Magnetic resonance imaging (MRI) has proven a sensitive tool in non-invasively monitoring pathological changes of soft tissues. However, classification of abnormal and normal tissues in clinical diagnosis is still largely based on human observation. It is often difficult to detect microscopic abnormalities in tissues, for example, subtle abnormalities in Normal Appearing White Matter (NAWM) of Multiple Sclerosis (MS) patients.

Pathological changes in tissues cause changes in relaxation time of the tissues during the magnetic resonance image capturing process. It, therefore, affects pixel intensities in corresponding regions in an MR image. In turn this changes a characteristic pattern of image intensity or "texture". As tissue becomes abnormal its underlying texture in an MR image changes. Image texture also uniquely determines its local spatial spectral/frequency content.

The S-Transform (ST), disclosed in: L. Mansinha, R. G. Stockwell., R. P. Lowe, M. Eramian, R. A. Schincariol, "Local S-spectrum analysis of 1-D and 2-D data", Phys. Earth Plan. Interiors. 103, 329-336 (1997), provides multi-resolution local frequency content by Fourier transforming an image localized by frequency-dependent Gaussian windows. The Gaussian localizing windows are chosen such that relative optimal resolutions in both time and frequency are achieved. The Stockwell representation of an image is relatively easy to interpret as local frequency content is displayed in the classic Fourier domain using spatial frequency variables. The Stockwell spectrum is unique and invertible with the Fourier domain. Therefore, the ST is suitable for analyzing subtle spatial variations of the frequency content in an image.

However, the ST is not rotation-invariant. In other words, the rotation of the Stockwell spectrum of an image is not equal to the Stockwell spectrum of the same image rotated. Typically, in diagnostic imaging one looks for abnormal structures such as textures or edges embedded in a normal spatial variation of gray tones in an image of tissues. These features should not change with rotation of the image or anatomical position.

This drawback is overcome in the Polar S-Transform (PST) with the shape of the Gaussian localizing window being fixed to a same centre frequency but rotating with frequency orientation. Therefore, rotating a local region does not change its local spectrum providing information on subtle structural changes un-affected by local image orientation or rotation.

Although the PST provides a unique space-frequency representation of an image resulting in a texture map of an MRI image for enhancing differences indicating lesions or other abnormalities due to disease activity that are difficult to distinguish in conventional MR images, there is a large amount of redundancy in this representation. This causes substantial difficulties in data storage and direct data visualization prohibiting employment of this highly beneficial signal processing tool in a clinical setting.

It would be advantageous to overcome the drawbacks by providing a method and system for image texture segmentation based on the PST having substantially reduced redundancy while keeping maximal data variation. Being able to identify tissue abnormalities more accurately by employing image texture segmentation based on the PST has a direct impact on patient care and treatment. Furthermore, such an image texture segmentation method and system based on the PST would be highly beneficial not only for image texture segmentation in medical applications but in numerous other industrial and scientific applications.

SUMMARY OF THE INVENTION

It is, therefore, an object of the invention to provide a method and system for image texture segmentation based on the PST having substantially reduced redundancy while keeping maximal data variation.

In accordance with the present invention there is provided a method for segmenting texture of multi-dimensional data indicative of a characteristic of an object comprising:
receiving the multi-dimensional data;
transforming the multi-dimensional data into second multi-dimensional data within a Stockwell domain using a polar S-transform of the multi-dimensional data;
applying principal component analysis to the second multi-dimensional data for generating texture data characterizing texture around data points of at least a portion of the multi-dimensional data; and,
partitioning the data points of the at least a portion of the multi-dimensional data into clusters based on the texture data using a classification process.

In accordance with the present invention there is further provided a storage medium having stored therein executable commands for execution on a processor, the processor when executing the commands performing:
receiving the multi-dimensional data;
transforming the multi-dimensional data into second multi-dimensional data within a Stockwell domain using a polar S-transform of the multi-dimensional data;
applying principal component analysis to the second multi-dimensional data for generating texture data characterizing texture around each data point of at least a portion of the multi-dimensional data; and,
partitioning the data points of the at least a portion of the multi-dimensional data into clusters based on the texture data using a classification process.

In accordance with the present invention there is yet further provided a system for segmenting texture of multi-dimensional data indicative of a characteristic of an object comprising:
an input port for receiving the multi-dimensional data;
a processor in communication with the first port for:
transforming the multi-dimensional data into second multi-dimensional data within a Stockwell domain using a polar S-transform of the multi-dimensional data;
applying principal component analysis to the second multi-dimensional data for generating texture data characterizing texture around each data point of at least a portion of the multi-dimensional data; and,
partitioning the data points of the at least a portion of the multi-dimensional data into clusters based on the texture data using a classification process;

producing a texture map based on the partitioned data points of the multi-dimensional data, wherein data points of the multi-dimensional data within a cluster corresponding to a same texture region have a same texture value assigned thereto; and, an output port in communication with the processor for providing data indicative of the texture map.

BRIEF DESCRIPTION OF THE FIGURES

Exemplary embodiments of the invention will now be described in conjunction with the following drawings, in which.

DETAILED DESCRIPTION OF THE INVENTION

Figure 1:
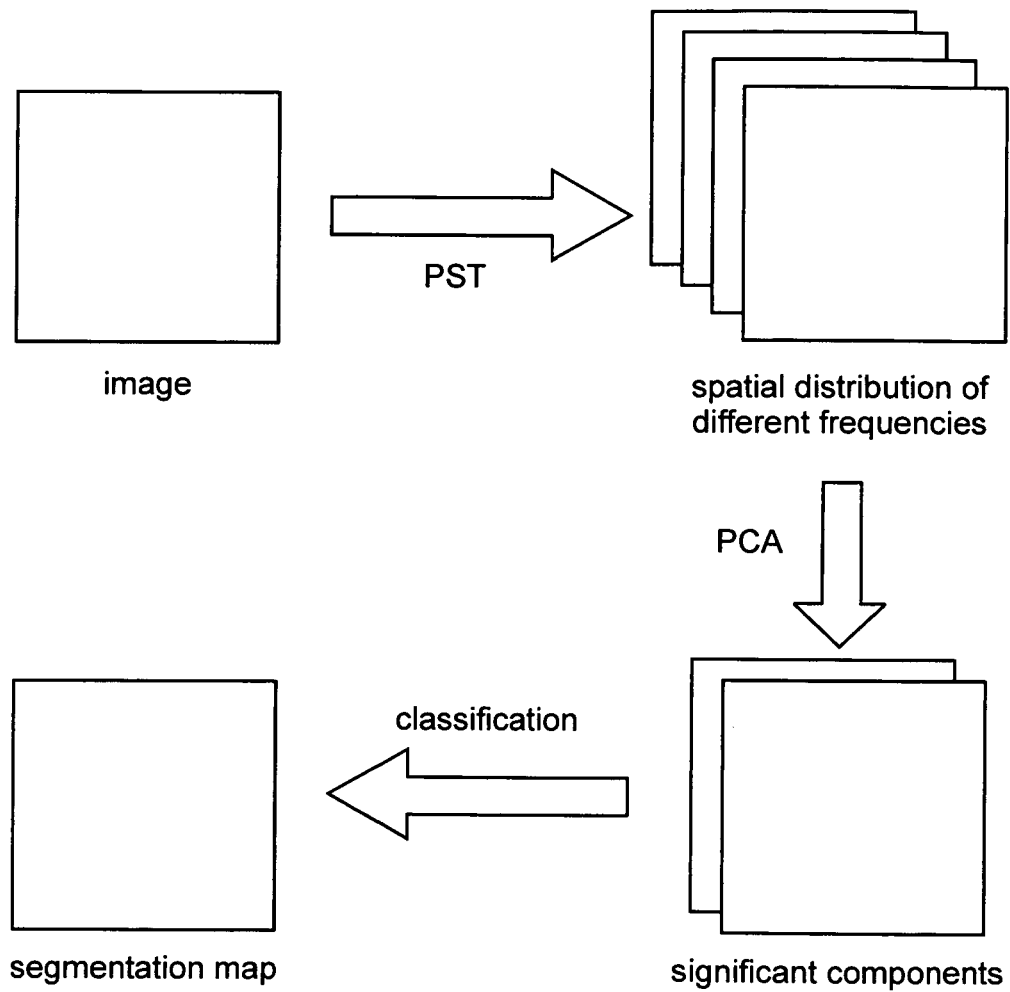
FIG. 1 is a diagram schematically illustrating three major processing steps of a method for texture segmentation according to the invention.

In the following, the description of the method and system for image texture segmentation according to the invention is limited to the processing of 2D MRI image data for the sake of simplicity and clarity. However, it will become apparent to those in the art that the method and system for image texture segmentation is not limited thereto but is expandable for texture segmentation of data in more than two dimensions in a straightforward manner. Furthermore, the texture segmentation based on the method and system according to the invention is also applicable in numerous other applications such as, for example, analyzing data in geophysical applications.

The 2D ST provides multi-resolution local frequency content by Fourier transforming an image localized by frequency-dependent Gaussian windows. The Gaussian localizing windows are chosen such that relative optimal resolutions in both time and frequency are achieved. The Stockwell spectrum of a 2D image is relatively easy to interpret as local frequency content is represented in the classic Fourier domain ($k_x$, $k_y$), where $k_x$ and $k_y$ are spatial frequency variables. The Stockwell spectrum is unique and invertible with the Fourier spectrum. Therefore, the 2D ST is suitable for analyzing spatial variations of the frequency content in a 2D image.

However, the 2D ST is not rotation-invariant. In other words, the rotation of the Stockwell spectrum of an image is not equal to the Stockwell spectrum of the same image rotated. This characteristic results from the fact that the Gaussian localizing windows are scaled by the inverse of $k_x$ along the x direction, and the inverse of $k_y$ along the y direction. Therefore, the shape of the Gaussian localizing windows varies with the centre frequency $k=\sqrt{k_x^2+k_y^2}$ as well as the frequency orientation $$\theta = \operatorname{atan}\left(\frac{k_y}{k_x}\right),$$

resulting in the likelihood that a local Stockwell spectrum at a given image pixel is represented differently after the image being rotated.

To overcome this drawback of the ST the Polar S-Transform (PST) is used for the method and system of texture segmentation according to the invention. The Gaussian localizing window defined in the PST is fixed to a same centre frequency k but rotates with the frequency orientation θ. Therefore, the PST is rotation-invariant.

The PST of a 2D image I(x, y) is defined as follows:

$$S(x, y, k_x, k_y) = \int_{-\infty}^{+\infty}\int_{-\infty}^{+\infty} I(x', y')w(x'-x, y'-y, f, \theta) \quad (1)$$
$$e^{-i2\pi(k_x x'+k_y y')}dx'dy'$$

Here, w(x,y,f,θ) is the localizing Gaussian window, namely $$w(x, y, k, \theta) = \frac{k^2\lambda(k)}{2\pi}e^{-\frac{k^2}{2}(x\cos\theta+y\sin\theta)^2}e^{-\frac{(k\lambda(k))^2}{2}(-x\sin\theta+y\cos\theta)^2} \quad (2)$$

where $k=\sqrt{k_x^2+k_y^2}$ is the centre frequency, $$\theta = \operatorname{atan}\left(\frac{k_y}{k_x}\right)$$

is the frequency orientation, and λ(k)>0 is a function of k. The window width, independent of θ, is scaled by $$\frac{1}{k}$$

along the radial direction and by $$\frac{1}{k\lambda(k)}$$

along the orientation direction. The function $\lambda(k)$ is an aspect ratio determining the shape of the localizing Gaussian window for a given centre frequency. It is noted that for $\lambda(k)=1$, the window is symmetric in both directions and its slices in the x-y plane are circles. $\lambda(k)$ is an important factor for adjusting spatial and spectral resolution. A small value for $\lambda(k)$ yields a broad window, poorer spatial resolution but better spectral resolution; conversely, a large value for $\lambda(k)$ yields a narrow window, good spatial resolution, but poorer spectral resolution.

Analogous to the ST, it is possible to express equation (1) in the Fourier domain using the Fourier convolution theorem:

$$S(x, y, k_x, k_y) = \int_{-\infty}^{+\infty}\int_{-\infty}^{+\infty} H(\alpha + k_x, \beta + k_y) W(\alpha, \beta, k, \theta) \quad (3)$$
$$e^{i2\pi(\alpha x + \beta y)} d\alpha d\beta$$

where $$I(x, y) \xrightarrow{2DFT} H(\alpha, \beta).$$

The Fourier transform of the Gaussian localizing window is:

$$w(x, y, k, \theta) \xrightarrow{2DFT} W(\alpha, \beta, k, \theta) = \quad (4)$$
$$e^{-2\pi^2(\alpha\cos\theta + \beta\sin\theta)^2/k^2} e^{-2\pi^2(-\alpha\sin\theta + \beta\cos\theta)^2/(k\lambda(k))^2}.$$

Implementation of equation (3) reduces calculation time by using the computationally efficient Fast Fourier Transformation (FFT). As a polar form of the ST, the PST inherits profound properties of the ST such as preserving signal energy and being easily invertible with the Fourier spectrum.

Given a 2D image I(x, y) or a Region Of Interest (ROI) within an image, the method for texture segmentation according to the invention classifies image pixels into regions with homogeneous texture according to their local spectral information. The method comprises three major steps, as shown in FIG. 1. First, using the PST a local spectrum of the image is determined. Second, frequency information at different spatial locations is reduced and extracted to produce optimal local spectral information. Finally, this optimal local spectral information is used to classify image pixels.

Applying the PST to a 2D image function I(x, y) generates local spectral information $S(x,y,k_x,k_y)$. However, the Stockwell spectrum retains the spectral variables $k_x$ and $k_y$ as well as the spatial variables x and y, resulting in a complex-valued function of four variables. Visualization of such 4D results is difficult but provides valuable insight into local spectral content of an image. To aid visualization and interpretation of local spectral content, a one dimensional real function is extracted from the magnitude of the two dimensional complex local spectrum at a fixed spatial point (x, y) expressed in polar coordinates, i.e.:

$$L_{xy}(k,\theta) = |S(x,y,k_x,k_y)|_{(x,y)}. \quad (5)$$

This 1D function is obtained by integrating the local spectrum $L_{xy}(k, \theta)$ along the radial direction:

$$L_{xy}(k) = \int_\theta L_{xy}(k, \theta) d\theta. \quad (6)$$

The integral in equation (6) describes the distribution of the center frequencies within a neighborhood of the fixed spatial point (x,y). Therefore, applying the PST and the radial integration (6) to a 2D image I(x, y) produces a modified Stockwell spectrum $\bar{S}(x,y,k)$ that provides a simple but detailed description of the behavior of the local spectrum of the image. Furthermore, the modified Stockwell spectrum $\bar{S}(x,y,k)$ is easily examined using volume visualization techniques.

For a 2D image I(x, y), a modified Stockwell spectrum $\bar{S}(x,y,k)$ is obtained using the data processing procedure described below. In this procedure, determination of the radial sum—equation (6)—is combined with the determination of the PST—equations (3) and (4). Further, this process is implemented over half the Fourier domain since an image I(x, y) exhibits conjugate symmetry in the Fourier domain.

The determination and extraction of the local spectra $\bar{S}(x,y,k)$ using equations (3) to (6) is then performed as follows:

1) Fast Fourier Transforming the image I(x, y):

$$H(\alpha, \beta) \xleftarrow{FFT_{xy}} I(x, y);$$

2) For every spectrum $(k_x, k_y)$ where $k_x, k_y \neq 0$, i.e. non-zero centre frequency, performing the following steps:
   A) Calculating a center frequency k and a corresponding orientation angle $\theta$;
   B) Calculating a 2D Gaussian localizing window W $(\alpha,\beta,k,\theta)$ at a current frequency $(k,\theta)$ according to equation (4);
   C) Shifting the Fourier spectrum $H(\alpha,\beta)$ to $H(\alpha+k_x,\beta+k_y)$;
   D) Calculating a point-wise multiplication of $H(\alpha+k_x, \beta+k_y)$ and $W(\alpha,\beta, k,\theta)$, denoted as $M(\alpha,\beta,k,\theta)$;
   E) Inverse Fast Fourier Transforming $M(\alpha,\beta,k,\theta)$ to produce the spatial information with respect to an occurrence of the current frequency:

$$P_{k\theta}(x, y) \xleftarrow{iFFT_{\alpha\beta}} M(\alpha, \beta, k, \theta);$$

F) Updating the modified Stockwell spectrum corresponding to the current centre frequency k: $\bar{S}(x,y,k) \leftarrow \bar{S}(x,y,k)+|P_{k\theta}(x,y)|$; and,
3) For zero center frequency, i.e. $k_x=k_y=0$, assigning: $\bar{S}(x,y,0)f$mean(I(x,y)).

By combining the radial sum with the PST less memory is used since only the radial sum of the Stockwell spectrum is stored in the modified Stockwell spectrum $\bar{S}(x,y,k)$, i.e. $O(N^3)$ storage space is used for a N×N image instead of $O(N^4)$ for a full PST spectrum $S(x,y,k_x,k_y)$. It is noted that in the above procedure $O(N^4 \log N)$ operations are performed for calculating $N^2/2$ complex 2D FFTs.

The modified Stockwell spectrum $\overline{S}(x,y,k)$ at a fixed central frequency k is a texture image in the x-y plane, revealing where the texture corresponding to the frequency k occurs in the image I(x, y), i.e. the spatial distribution of the frequency k. However, there is a high level of redundancy in the Stockwell spectrum. In image texture segmentation the focus is on a good spatial separation between different textures, i.e. frequencies, for segmenting an image. Therefore, it is important to reduce information redundancy and extract significant components for providing maximal spatial separation of textures.

Principal Component Analysis (PCA)—also known as Karhunen-Loeve transform—is a process that transforms a number of correlated variables to a smaller number of uncorrelated variables—called Principal Components (PC). A first PC represents maximum data variation, while a second PC represents a following maximum data variation orthogonal to or independent of the first PC. Higher order PCs represent directions of lesser data variation but remain mutually orthogonal. Therefore, the PCA reduces data correlation—or redundancy—while preserving the maximum variance. In other words, the PCA provides a compact and optimal description of a data set.

Here, the PCA is used to substantially reduce data redundancy and to extract components that significantly separate regions having different texture. More specifically, the PCA is applied to the modified Stockwell spectrum $$\{\overline{S}(x, y, k)\}_{k=0}^{k\max}$$

along the central frequency axis. To determine the number M of significant PCs an accumulate sum of corresponding eigenvalues—i.e. data variances—is calculated:

$$a(j) = \sum_{i=1}^{j} \lambda_i \bigg/ \sum_{i=1}^{k\max} \lambda_i \text{ for } j = 1, \ldots, k_{\max}.$$

By setting a threshold for the accumulate sum the number M of significant PCs is determined as input for pixel classification.

The pixel classification is based on the first M significant PCs selected by the PCA. Each PC has a value at the corresponding pixel location. Hence, at a fixed image pixel, the first M PCs form a vector of values characterizing the texture around the pixel. Next, a classification process such as the "K-means" process is applied. The K-means process iteratively partitions the pixels into K clusters, with each cluster represented by its mean vector and each data point assigned to the cluster with the closest vector. As is evident, various other classification processes are also applicable. Optionally, a user initializes the number of clusters K and selects the corresponding Regions Of Interest (ROI), the means of which are the initial mean vectors of the clusters. Finally, the classification result is shown as a texture map where pixels within a same texture region have a same value.

Figure 2:
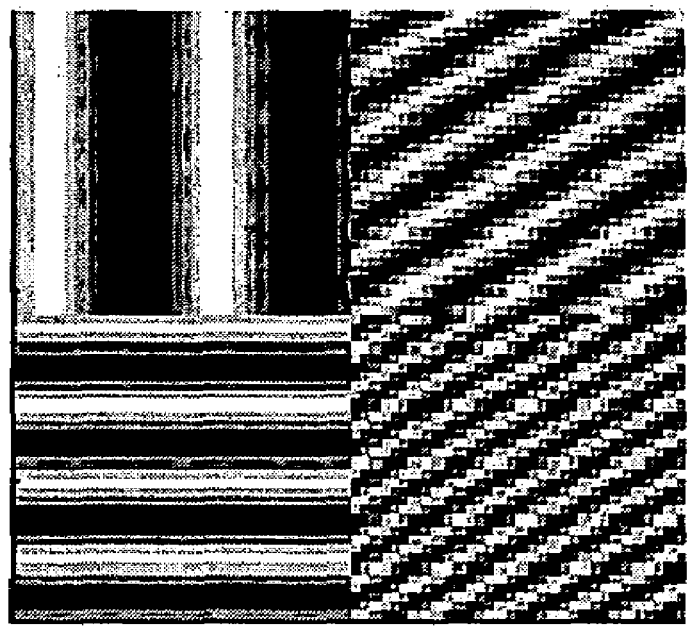
FIG. 2 is a diagram illustrating a synthetic image with multiple textured regions for testing performance of the method for texture segmentation according to the invention.
Figure 3:
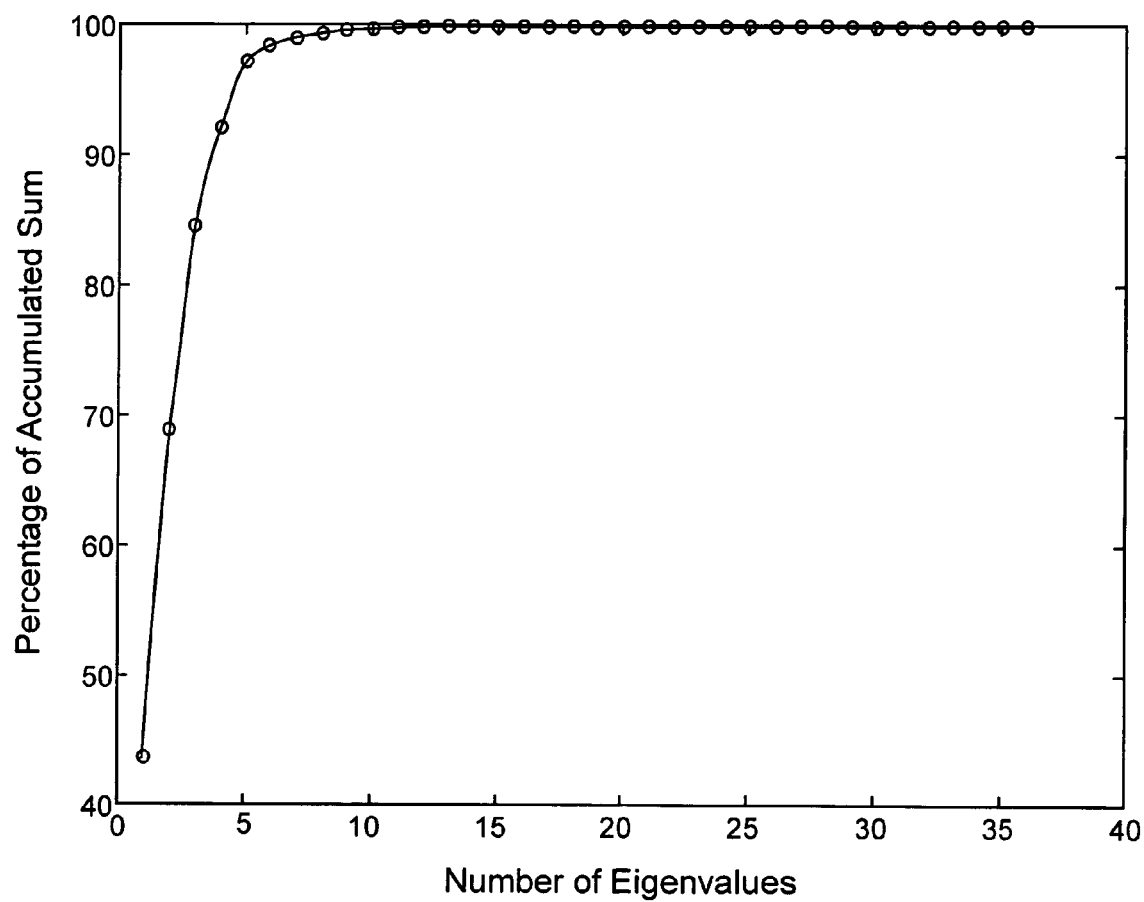
FIG. 3 is a diagram illustrating an accumulate sum of the eigenvalues of a PST spectrum corresponding to the image shown in FIG. 2.
Figure 4A:
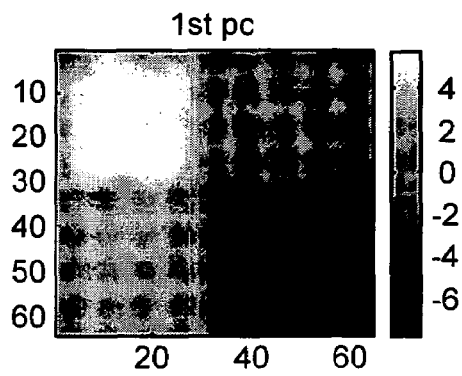
FIGS. 4a to 4d are diagrams illustrating projections of the image shown in FIG. 2 onto the first four principal component axes, respectively.
Figure 4B:
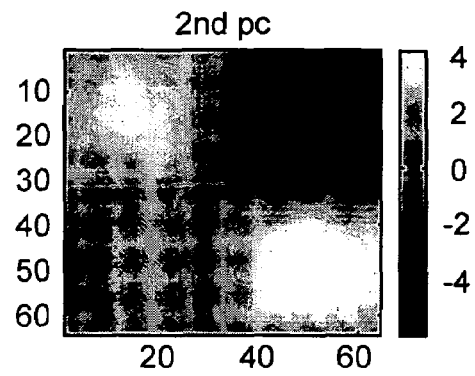
Figure 4C:
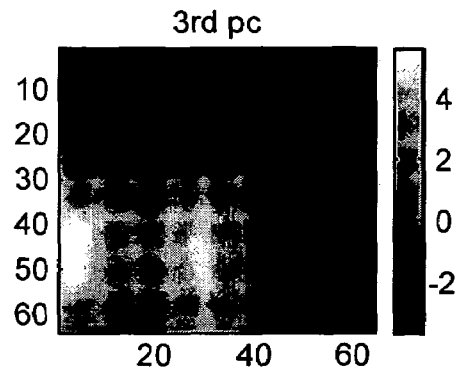
Figure 4D:
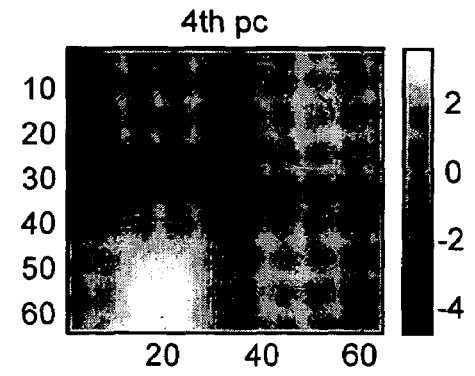
Figure 5A:
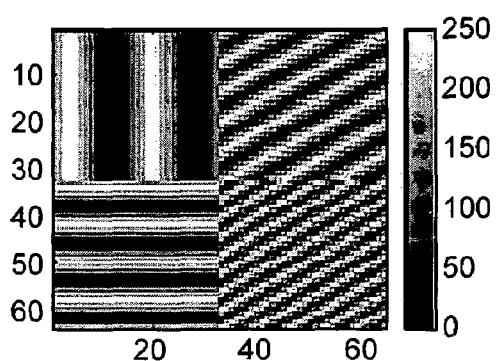
FIGS. 5a to 5d are diagrams illustrating a synthetic image with four different textured squares, an accurate texture map, a texture map based on the first four principal components using the PST based texture segmentation according to the invention, and a map showing misclassified pixels as black pixels, respectively.
Figure 5B:
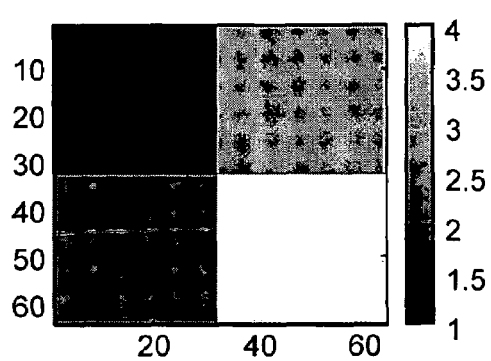
Figure 5C:
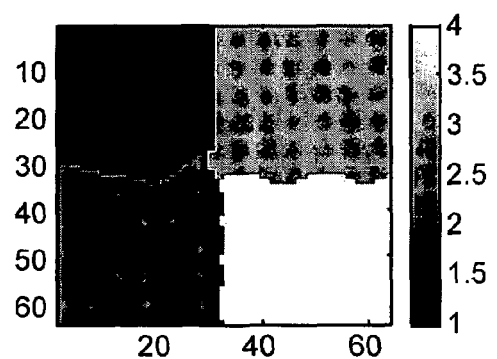
Figure 5D:
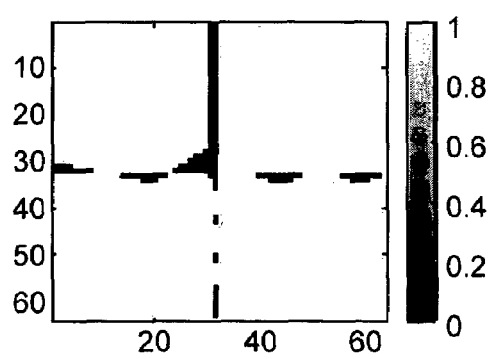

To validate the method for image texture segmentation according to the invention two synthetic images composed of multiple textured regions and an MR image captured from a MS patient have been analyzed. FIG. 2 illustrates a synthetic image with multiple textured regions and FIGS. 3 to 5 illustrate the intermediate steps and the final result of segmenting the image shown in FIG. 2. First, the modified Stockwell spectrum of the image shown in FIG. 2 is calculated. FIG. 3 shows the accumulate sum of the variances, i.e. eigenvalues, calculated by applying the PCA to the modified Stockwell spectrum of the image. Setting the threshold to 90% for the sum of the variances requires the first four PCs, i.e. M=4. FIGS. 4a to 4d show the projections modified Stockwell spectrum of the image shown in FIG. 2, onto the first four PC axes, respectively. Each projection onto one of the four PCs represents an approximate segmentation of the image based on spectral texture. Image pixels are then classified based on the selected four PCs using the K-means process. FIG. 5a shows the synthetic image of FIG. 2. FIG. 5b shows an optimal segmentation map, while FIG. 5c shows the segmentation map based on the first four PCs using the PST based texture segmentation according to the invention. Misclassified pixels are shown in black in FIG. 5d. The number of misclassified pixels is approximately 3.7% of the total number of pixels in the image; hence, the accuracy is 96.3%. Of course, setting a higher threshold for the sum of the variances will result in more PCs used for the segmentation and, therefore, in a higher accuracy.

Figure 6A:
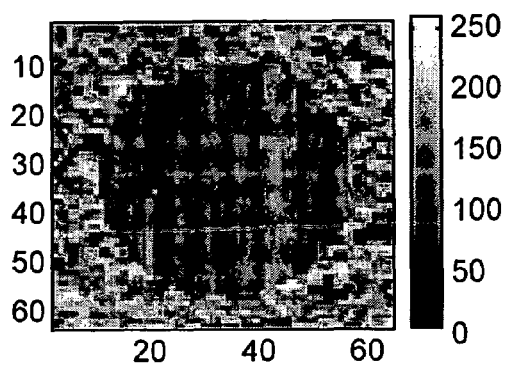
FIGS. 6a to 6d are diagrams illustrating a synthetic image with two different textured regions, an accurate texture map, a texture map based on the first three principal components using the PST based texture segmentation according to the invention, and a map showing misclassified pixels as black pixels, respectively.
Figure 6B:
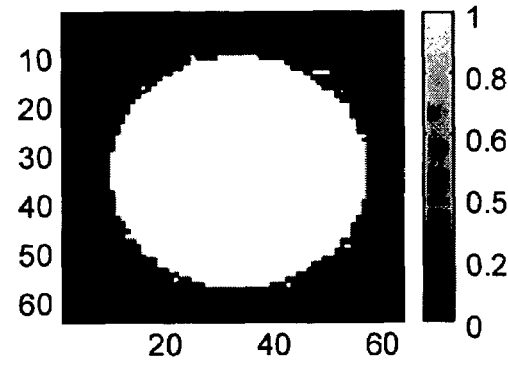
Figure 6C:
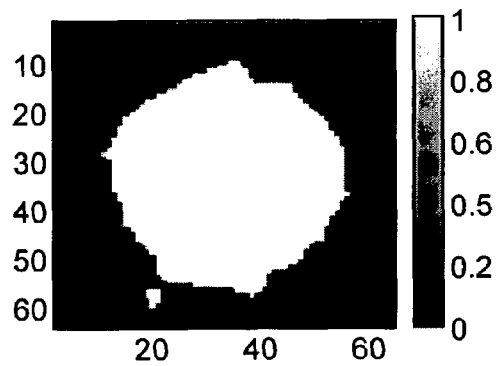
Figure 6D:
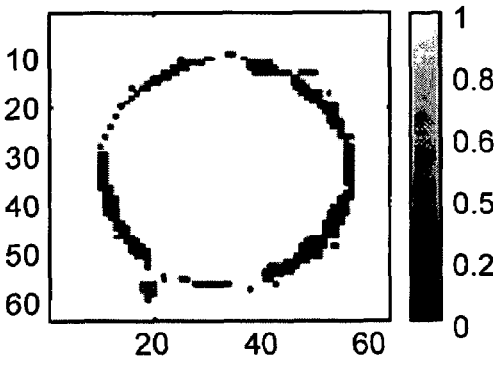

The same method for image texture segmentation has been applied to a synthetic image with more complex texture regions, shown in FIG. 6a. FIG. 6b shows an optimal segmentation map, while FIG. 6c shows the segmentation map based on the first three PCs using the PST based texture segmentation according to the invention. Misclassified pixels are shown in black in FIG. 6d. The number of misclassified pixels is approximately 6.5% of the total number of pixels in the image; hence, the accuracy is 93.5%.

Figure 7:
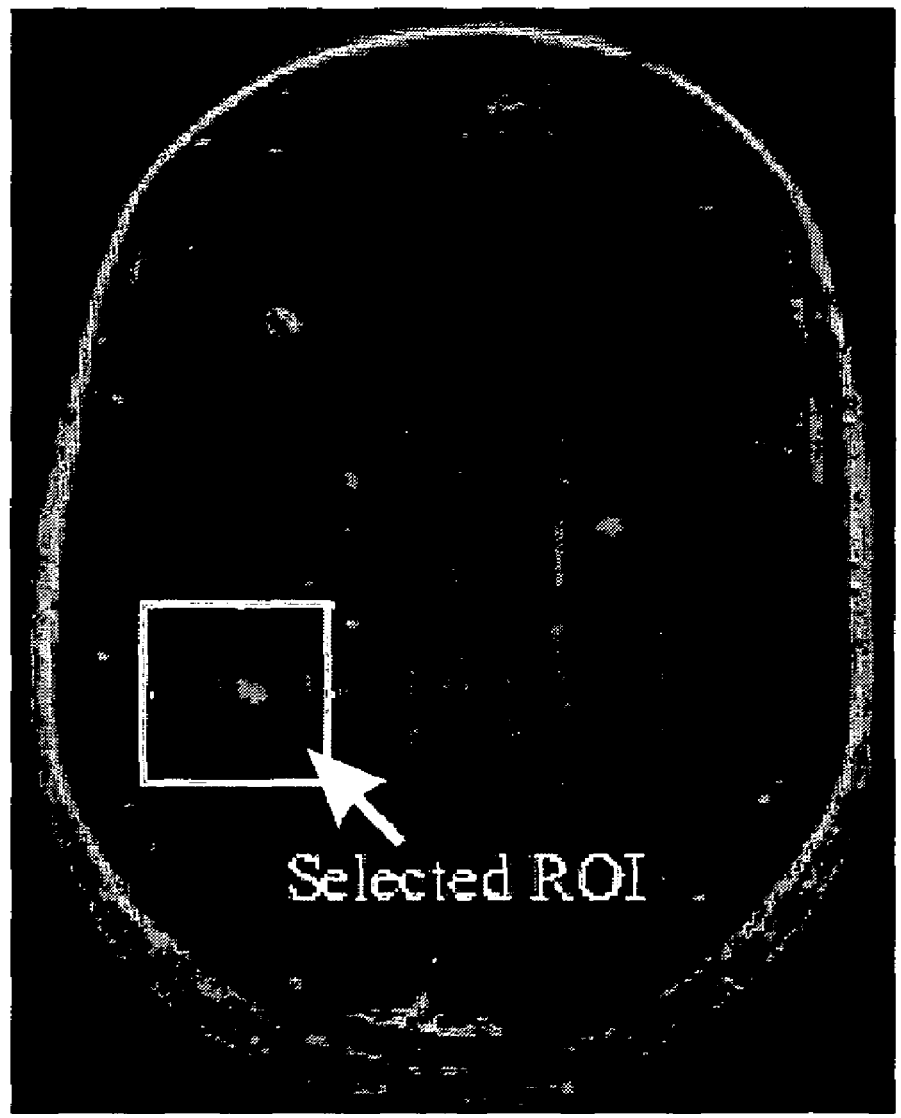
FIG. 7 is a diagram illustrating a T1-weight post-contrast MR image from a MS patient and a selected Region Of Interest (ROI)
Figure 8A:
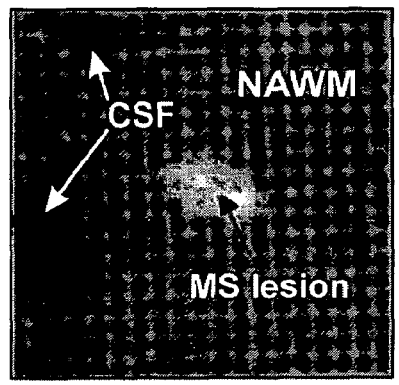
FIGS. 8a to 8c are diagrams illustrating the selected ROI shown in FIG. 7, a texture map of the ROI using the texture segmentation according to the invention, and the texture map superimposed onto the image of the selected ROI, respectively.
Figure 8B:
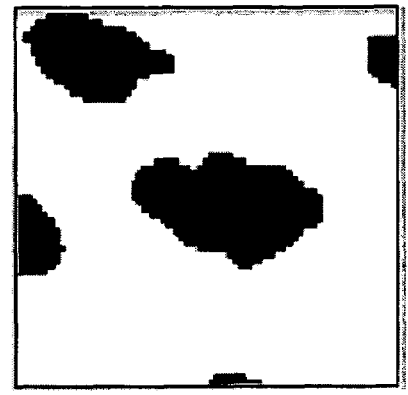
Figure 8C:
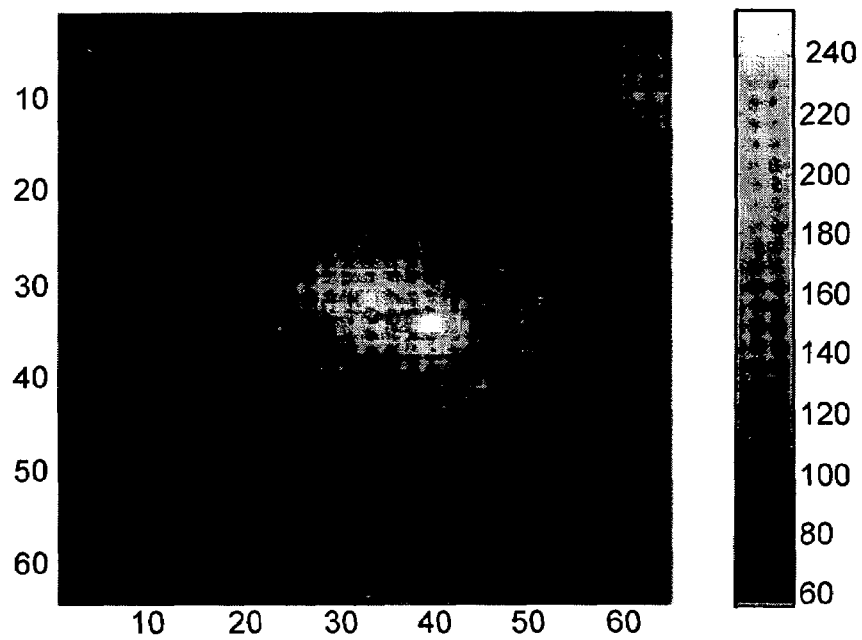

Further, the same method for image texture segmentation has been applied to a MR image of a relapsing-remitting MS patient examined on a 3 Tesla MR scanner (GE, Waukesha, Wis.). FIG. 7 shows a cross-sectional T1-weighted (T1w) post contrast image (Spin Echo, TE/TR=8/650 ms for T1w, FOV=24 cm, matrix size=512×512, slice thickness=3 mm). Texture segmentation was performed on a 64×64 ROI containing an enhanced lesion, Cerebral Spinal Fluid (CSF), and NAWM, as shown in FIGS. 7 and 8a. The image pixels have been segmented into NAWM and non-NAWM classes. The texture map illustrated in FIG. 8b shows the segmentation result. Finally, the texture map has then be superimposed to the original image, FIG. 8a, to highlight the spatial location of the non-NAWM regions, as shown in FIG. 8c.

Figure 9:
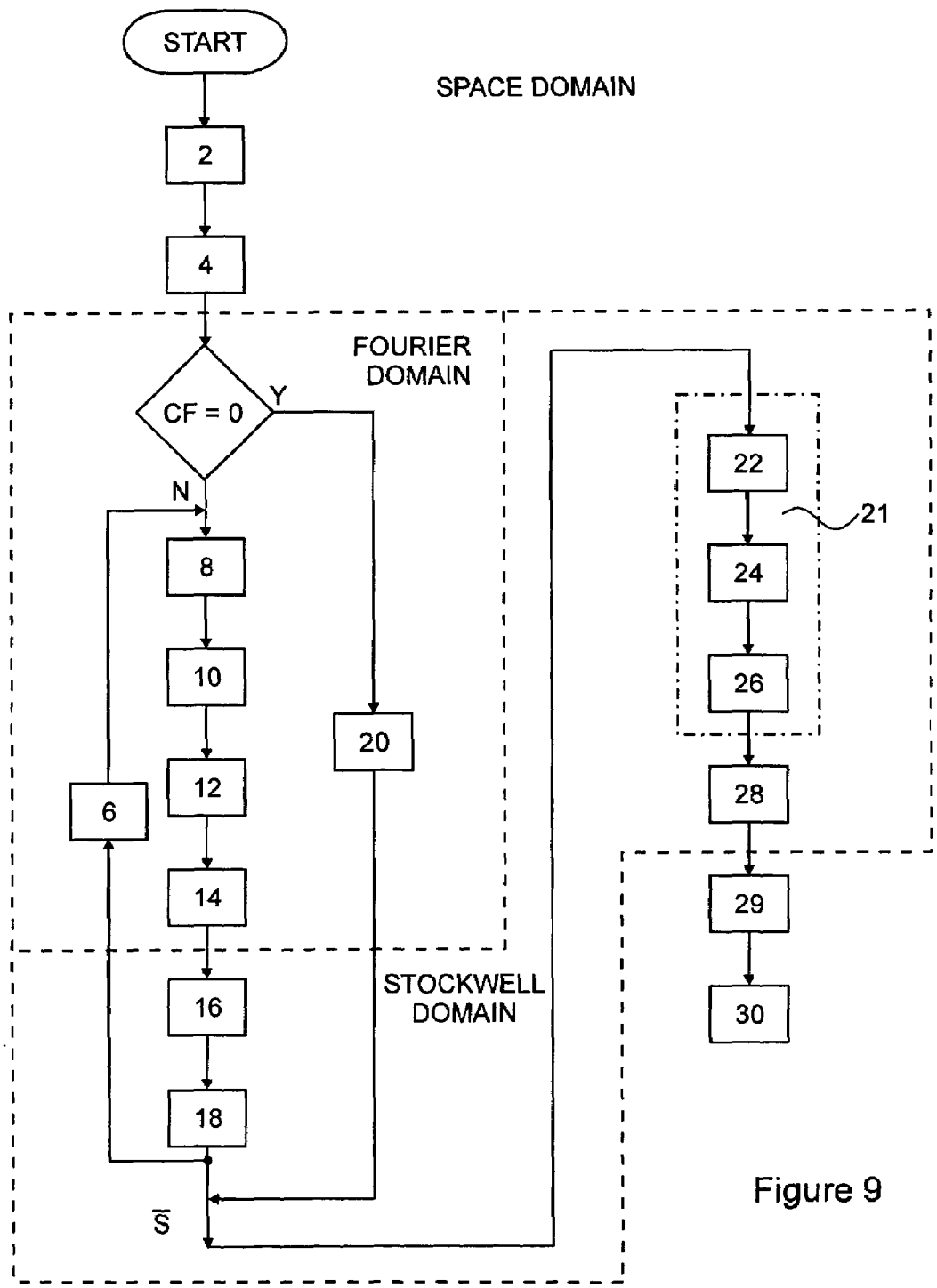
FIG. 9 is a flow diagram illustrating a method for texture segmentation according to the invention; and, FIG. 10 is a simplified block diagram illustrating a system for texture segmentation according to the invention.
Figure 10:
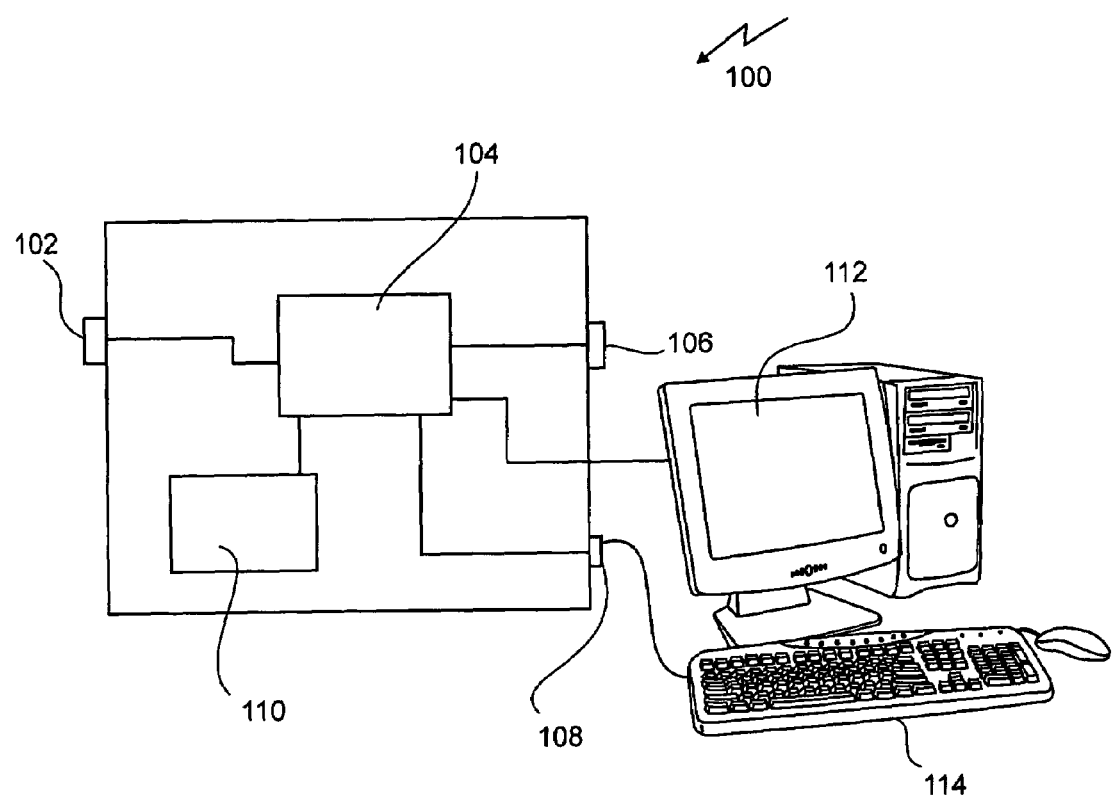

Referring to FIG. 9, a flow diagram of a method for texture segmentation of multi-dimensional data according to the invention is shown. A data processing system 100 according to the invention for implementing the texture segmentation method is shown in FIG. 10. Multi-dimensional signal data are received—block 2—at input port 102. Using electronic circuitry such as a processor 104 the multi-dimensional signal data are then digitally processed. First, the multi-dimensional data are transformed into Fourier domain—block 4. In case of non-zero center frequency (CF) the following steps are performed for each local spectrum, each local spectrum corresponding to a data point of the multi-dimensional data—block 6; calculating a center frequency and a corresponding orientation angle—block 8; calculating a Gaussian localizing window at a current centre frequency—block 10; shifting the Fourier spectrum by the current frequency—block 12; pointwise multiplying the shifted Fourier spectrum with the Gaussian localizing window—block 14; inverse fast Fourier transforming the product to produce spatial information with respect to an occurrence of the current frequency—block 16; and, updating the modified Stockwell spectrum corresponding to the current center frequency—block 18. In case of zero center frequency CF a mean of the multi-dimensional data is assigned to the modified Stockwell spectrum—block 20.

After determination of the modified Stockwell spectrum, PCA—block 21—is applied thereto along the central frequency axis. First, the accumulate sum of the variances—i.e. eigenvalues of the modified Stockwell spectrum—is calculated—block 22—and in dependence upon a predetermined threshold for the accumulate sum the number M of significant PCs is determined—block 24. After determination of the significant PCs the modified Stockwell spectrum is projected onto each of the M significant PCs—block 26. At a fixed data point of the multi-dimensional data the M PCs form a vector characterizing the texture around this data point.

Using a classification process the data points of multi-dimensional data are then partitioned into clusters based on the vectors characterizing the texture—block 28—producing a texture map where data points within a same texture region have a same value. The resulting texture map is then graphically displayed on display 112—block 30. Optionally, the texture map is superimposed to the multi-dimensional data—block 29—to highlight the spatial location of predetermined features.

Optionally, a probability texture map is produced that identifies the probability of a multi-dimensional data point belonging to one or more clusters. Based on the probability information a texture map is produced, wherein data points of the multi-dimensional data within a cluster corresponding to a same texture region have a same texture value assigned thereto.

The system 100 further comprises a storage medium 110 having stored therein executable commands for execution on the processor 104 for performing the signal processing. Alternatively, the processor 104 comprises electronic circuitry designed for performing at least a portion of the signal processing in a hardware implemented fashion. The system 100 further comprises an output port 106 for providing the processed signal data for storage or further processing.

In one embodiment of the method for texture segmentation according to the invention, at least a ROI is selected by a user for texture segmentation. The selection is performed by a user viewing, for example, a graphical representation of the multi-dimensional data on display 112 and providing control commands via port 108—connected, for example, to a keyboard 114—to the processor 104. Preferably, the display 112 is a graphical user interface facilitating user interaction during signal processing. Optionally, user knowledge is integrated into the classification process by enabling the user to initialize the number K of different clusters, for example, NAWM and non-NAWM.

The method and system for image texture segmentation according to the invention provides image texture segmentation based on the PST having substantially reduced redundancy while keeping maximal data variation. These features enable image texture segmentation based on the PST using a desktop computer or workstation. For example, being able to identify tissue abnormalities more accurately in a clinical setting has a direct impact on patient care and treatment. Furthermore, the texture segmentation according to the invention is also applicable in numerous other industrial and scientific applications.

Although, the method and system for image texture segmentation according to the invention has been implemented using the PST, it is evident to one skilled in the art that it is also possible to implement the image texture segmentation by applying the PCA and classification to multi-dimensional data within a space-frequency domain using a different form of a rotation-invariant localized space-frequency transformation of the multi-dimensional data.

Numerous other embodiments of the invention will be apparent to persons skilled in the art without departing from the spirit and scope of the invention as defined in the appended claims.

What is claimed is:

1. A method for segmenting texture of multi-dimensional data indicative of a characteristic of an object comprising:
   receiving the multi-dimensional data;
   transforming the multi-dimensional data into second multi-dimensional data within a Stockwell domain using a rotation-invariant form of the S-transform of the multi-dimensional data;
   applying principal component analysis to the second multi-dimensional data for generating texture data characterizing texture around data points of at least a portion of the multi-dimensional data; and,
   partitioning the data points of the at least a portion of the multi-dimensional data into clusters based on the texture data using a classification process.

2. A method for segmenting texture as defined in claim 1 wherein the rotation-invariant form of the S-transform is a polar S-transform.

3. A method for segmenting texture as defined in claim 2 comprising:
   producing a texture map based on the partitioned data points of the multi-dimensional data, wherein data points of the multi-dimensional data within a cluster corresponding to a same texture region have a same texture value assigned thereto.

4. A method for segmenting texture as defined in claim 3 wherein the texture map is produced based on a probability of each partitioned data point of belonging to at least one of the clusters.

5. A method for segmenting texture as defined in claim 3 comprising:
   superimposing the texture map to the multi-dimensional data such that texture values and data values of respective data points of the texture map and the multi-dimensional data are superimposed.

6. A method for segmenting texture as defined in claim 2 comprising:
   determining a modified Stockwell spectrum by integrating local spectra along a radial direction.

7. A method for segmenting texture as defined in claim 6 comprising:
   transforming the multi-dimensional data into a Fourier domain.

8. A method for segmenting texture as defined in claim 7 wherein transforming the multi-dimensional data comprises performing for each local spectrum corresponding to a data point of the multi-dimensional data:
   calculating a current center frequency and a corresponding orientation angle;
   calculating a localizing Gaussian window at the current centre frequency;
   shifting the Fourier transformed multi-dimensional data by frequency components corresponding to the current centre frequency;

producing product data by pointwise multiplying the shifted Fourier transformed multi-dimensional data with the localizing Gaussian window;

inverse Fourier Transforming the product data; and, updating the modified Stockwell spectrum based on the inverse Fourier transformed product data.

9. A method for segmenting texture as defined in claim 8 wherein a mean of the multi-dimensional data is assigned to a respective data point in the modified Stockwell spectrum if the centre frequency corresponding to the data point is zero.

10. A method for segmenting texture as defined in claim 6 wherein applying principal component analysis comprises projecting the second multi-dimensional data onto principal components.

11. A method for segmenting texture as defined in claim 10 wherein the principal component analysis is applied along a central frequency axis of the modified Stockwell spectrum.

12. A method for segmenting texture as defined in claim 11 wherein a number of significant principal components is determined based on an accumulate sum of corresponding eigenvalues of the modified Stockwell spectrum.

13. A method for segmenting texture as defined in claim 3 wherein the multi-dimensional data are MR image data.

14. A method for segmenting texture as defined in claim 13 wherein the data points of the at least a portion of the multi-dimensional data are partitioned into data points corresponding to image pixels representing normal appearing white matter and data points corresponding to image pixels representing non normal appearing white matter.

15. A storage medium having stored therein executable commands for execution on a processor, the processor when executing the commands performing:

receiving the multi-dimensional data;

transforming the multi-dimensional data into second multi-dimensional data within a Stockwell domain using a polar S-transform of the multi-dimensional data;

applying principal component analysis to the second multi-dimensional data for generating texture data characterizing texture around each data point of at least a portion of the multi-dimensional data; and, partitioning the data points of the at least a portion of the multi-dimensional data into clusters based on the texture data using a classification process.

16. A storage medium as defined in claim 15 having stored therein executable commands for execution on a processor, the processor when executing the commands performing:

producing a texture map based on the partitioned data points of the multi-dimensional data, wherein data points of the multi-dimensional data within a cluster corresponding to a same texture region have a same texture value assigned thereto.

17. A storage medium as defined in claim 16 having stored therein executable commands for execution on a processor, the processor when executing the commands performing:

superimposing the texture map to the multi-dimensional data such that texture values and data values of respective data points of the texture map and the multi-dimensional data are superimposed.

18. A storage medium as defined in claim 17 having stored therein executable commands for execution on a processor, the processor when executing the commands performing:

determining a modified Stockwell spectrum by integrating local spectra along a radial direction.

19. A system for segmenting texture of multi-dimensional data indicative of a characteristic of an object comprising:

an input port for receiving the multi-dimensional data;

a processor in communication with the input port for:

transforming the multi-dimensional data into second multi-dimensional data within a Stockwell domain using a polar S-transform of the multi-dimensional data;

applying principal component analysis to the second multi-dimensional data for generating texture data characterizing texture around each data point of at least a portion of the multi-dimensional data; and, partitioning the data points of the at least a portion of the multi-dimensional data into clusters based on the texture data using a classification process;

producing a texture map based on the partitioned data points of the multi-dimensional data, wherein data points of the multi-dimensional data within a cluster corresponding to a same texture region have a same texture value assigned thereto; and, an output port in communication with the processor for providing data indicative of the texture map.

20. A system for segmenting texture as defined in claim 19 wherein the processor comprises electronic circuitry designed for performing at least a portion of transforming the signal data into second signal data and processing the second signal data.

21. A system for segmenting texture as defined in claim 19 comprising a control port in communication with the processor for receiving control commands for controlling at least one of determining a region of interest, generation of texture data, and classification.

22. A system for segmenting texture as defined in claim 21 comprising a graphical display in communication with the processor for displaying at least the data indicative of the texture map in a graphical fashion.

23. A system for segmenting texture as defined in claim 22 wherein the graphical display comprises a graphical user interface.

24. A method for segmenting texture of multi-dimensional data indicative of a characteristic of an object comprising:

receiving the multi-dimensional data;

transforming the multi-dimensional data into second multi-dimensional data within a space-frequency domain using a rotation-invariant localized space-frequency transformation of the multi-dimensional data;

applying principal component analysis to the second multi-dimensional data for generating texture data characterizing texture around data points of at least a portion of the multi-dimensional data; and, partitioning the data points of the at least a portion of the multi-dimensional data into clusters based on the texture data using a classification process.

* * * * *